(No Model.)
E. P. NOYES.
PLANTER AND CULTIVATOR.
No. 336,014. Patented Feb. 9, 1886.
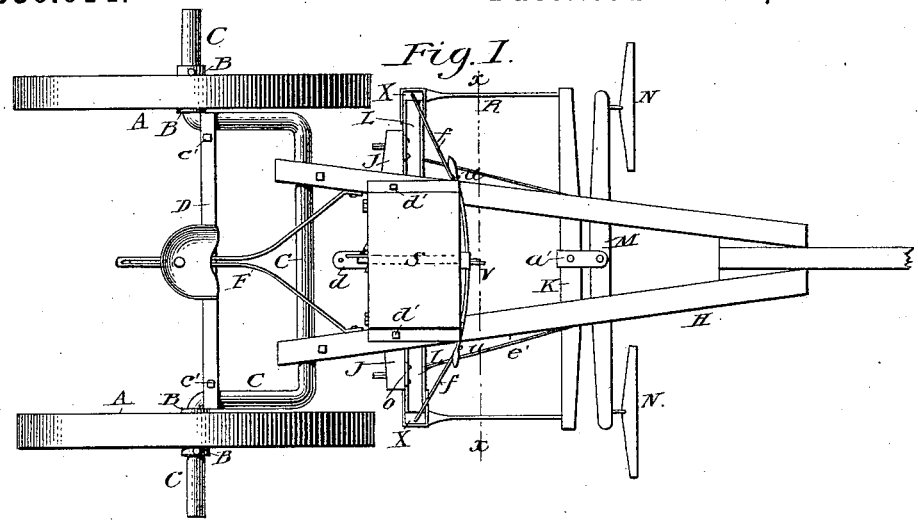
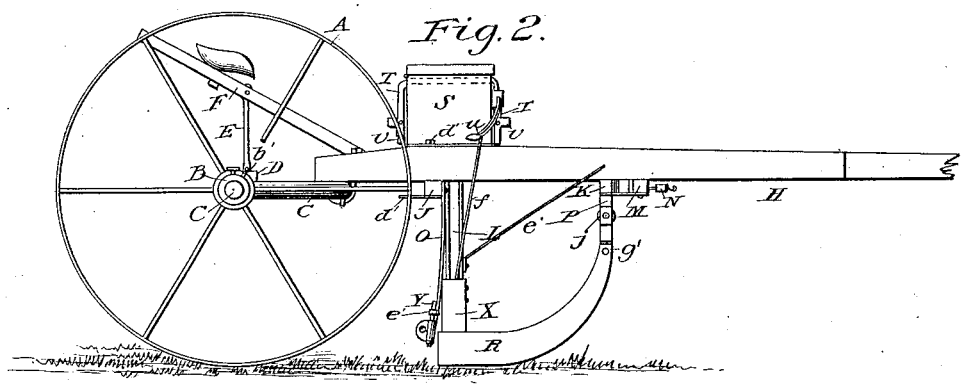
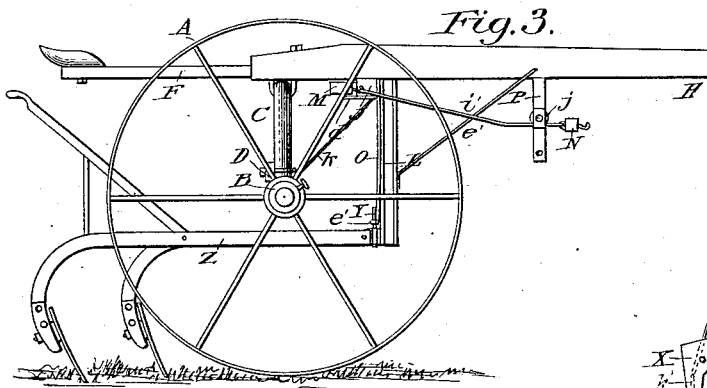
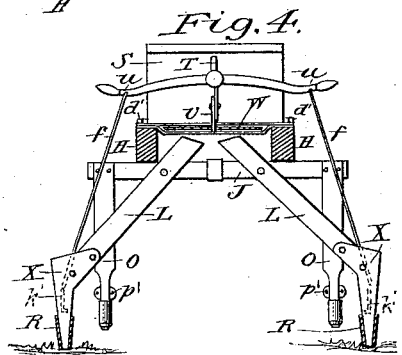
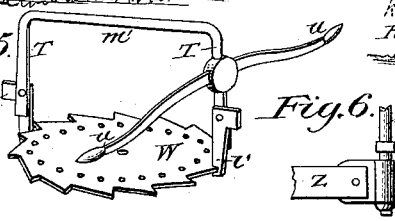
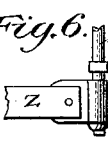
Witnesses:
Emily Noyes
Martha Noyes
Inventor.
Edward P. Noyes

UNITED STATES PATENT OFFICE.

EDWARD PAYSON NOYES, OF SEVILLE, OHIO.

PLANTER AND CULTIVATOR.

SPECIFICATION forming part of Letters Patent No. 336,014, dated February 9, 1886.

Application filed July 26, 1884. Serial No. 138,699. (No model.)

*To all whom it may concern:*

Be it known that I, EDWARD PAYSON NOYES, of Seville, in the county of Medina and State of Ohio, have invented a new and useful Improvement in a Corn Planter and Cultivator, of which the following is a specification.

The object of my invention is to produce by a simple combination a machine that may be used either as a planter or a cultivator by the use of different attachments.

In the accompanying drawings, similar letters of reference indicate like parts.

Figure 1 is a top view of the planter. Fig. 2 is a side view of the planter. Fig. 3 is a side view of the machine arranged as a cultivator. Fig. 4 is a detail cross-section of the seed-box, conductor-spouts, tubes with the attached runners, swing, lever, drop-slides, and the plow-coupling device through the line $xx$, Fig. 1. Fig. 5 is the swinging device which rotates the seed-plate. Fig. 6 is the plow-coupling.

In Fig. 1, A are the wheels, with rims sufficiently wide to press the soil down upon the seed and cover it. The wheels A revolve upon the long journals of the axle C, upon which they are secured adjustably by rings and set-screws B, or by linchpins. The axle C is bent four times at right angles, and its middle horizontal part works in bearings attached to the bars of the tongue H. The bars of the tongue H are connected and held in position by the cross-bars J K, to which are attached hammer-straps $a'$, so placed that the double-tree M may be put in front of the cross-bar K, or behind the cross-bar J, according as the machine is to be used as a planter or a cultivator.

D is a bar to support the seat-bars F, being connected with them by the upright support E, pivoted to the seat-bars at $b'$.

S is the detachable seed-box, the bottom of which extends outward beyond the box to receive the bolts $d'$, by which it is fastened in position.

L are the conducting-spouts, which convey the seed from the box S into the tubes X, attached to the lower ends of the spouts L. The spouts are fastened at the upper end to the cross-bar J, and are held in position at the proper inclination by braces O and $e'$. The rear ends of the runners R are fastened to the tubes X.

$f$ are rods attached to the lever U, by means of which the drop slides in the tubes X are operated.

In Fig. 2, P is an iron bar securely fastened to the cross-bar K, at right angles, to the bottom of which the front end of the runner is bolted.

T is the swing by which the seed-plate is revolved.

To change the machine to a cultivator, the seed-box S is removed by unscrewing the nuts at $d'$. The tubes X and runners R are removed by taking out the bolts $g'$ and the bolts which fasten the tubes X to the conductor-spouts L. The bar D, Fig. 1, with the upright support E, is removed by taking the bolt out of the seat-bars at $b'$ and unscrewing the nuts $c'$ at the ends of the bar D. Having removed these parts the tongue H is moved to its highest position by changing the crank of the axle from a horizontal to a perpendicular position, as shown in Fig. 3. The axle is fastened in its position by means of the brace $k$. The wheels A are moved toward the end of the axle by moving the rings B or linchpins, if used. The double-tree M is removed from before the cross-bar K and placed behind the cross-bar J. The single-tree N is placed in front of the bar P and connected with the double-tree M by the rod $i'$, which passes under the small wheel $j'$, attached to the bar P. The plow-beams Z are attached by the coupling Y.

The parts of the machine considered my present invention are illustrated by Figs. 4, 5, and 6.

Fig. 4 shows the manner of planting two rows by the use of one seed-box, S, placed between them. Beneath this box are two conductor-spouts, L, which convey the seed into the tubes X. Within the tubes X are drop-slides $k'$, connected by the rods $f$ with the lever U.

Fig. 5 shows the swinging device for revolving the seed-plate W. It consists of a shaft, $m'$, passing through the seed-box, which serves as a bearing, and is bent at right angles outside of the seed-box on each side. Catches $v$ are pivoted to the lower extremities of the arms T, which work in the notches of the seed-plate W. The swing is moved backward and forward by means of the lever U, and the catches $v$ falling into the notches of the seed-plate cause it to revolve. This device is attended with much less friction than the usual sliding arrangement.

The operator uses the seed-box S as a seat, Fig. 4. At the first stroke of the lever the seed passes out at the opposite sides of the seed-plate and slides down the conductors L into the tubes X, where it is retained by the drop-slides $k'$. At the next movement of the lever the seed drops from the tubes X into the ground and another charge passes down the spouts L and is caught by the drop-slides $k'$, as before. The drop-slides are flat plates bent at the lower end at right angles. When the slide moves downward, it comes in contact with the side of the tube and forms a receptacle for the seed which passes over the upper side of the slide. When the slide moves upward, the seed is dropped and the next charge passes on the under side of the slide, and is retained until the next movement.

The slides are indicated by dots at $k'$, Fig. 4.

When the machine is used with a drill attachment, the drop-slides can be removed.

O, Fig. 4, are the braces, bolted to the cross-bar J and the conductors L. These are formed at the lower end in such shape as to receive the plow-coupling, Fig. 6. The upright shaft Y is attached to the braces O by means of the U-shaped clamp $e'$, Fig. 6, fastened at the points $p'$, Fig. 4, by nuts. The shaft Y may be moved upward or downward to vary the point of draft of the plow-beams.

Having fully described my invention, what I claim as new, and desire to secure by Letters Patent, is—

1. In a seed-planter, the combination of the seed-box S, revolving seed-plate W, provided with peripheral teeth, shaft $m'$, and vibratory arms T, having pivoted in the ends thereof a catch, V, adapted to engage the said teeth for rotating the seed-plate, and lever U for operating said arms, all constructed and arranged to operate in the manner substantially as described, and for the purpose specified.

2. The arrangement of the tongue H, cross-bar J, conductor-spouts L, and plow-coupling Y, as herein shown and described.

EDWARD PAYSON NOYES.

Witnesses:
WM. BIGHAM,
JOHN T. GRAVES.